(12) United States Patent
Chang (10) Patent No.: US 10,181,589 B2
(45) Date of Patent: Jan. 15, 2019

(54) SECONDARY BATTERY PACKING CASE STRUCTURE

(71) Applicant: CHANGS ASCENDING ENTERPRISE CO., LTD., Taichung (TW)

(72) Inventor: Tsun-Yu Chang, Taichung (TW)

(73) Assignee: Changs Ascending Enterprise Co., Ltd., Taichung (TW)

( * ) Notice: Subject to any disclaimer, the term of this patent is extended or adjusted under 35 U.S.C. 154(b) by 278 days.

(21) Appl. No.: 15/036,077

(22) PCT Filed: Mar. 21, 2016

(86) PCT No.: PCT/CN2016/076854
§ 371 (c)(1),
(2) Date: May 12, 2016

(87) PCT Pub. No.: WO2017/161480
PCT Pub. Date: Sep. 28, 2017

(65) Prior Publication Data
US 2018/0102516 A1 Apr. 12, 2018

(51) Int. Cl.
*H01M 2/10* (2006.01)
*H01M 2/20* (2006.01)
*H01M 10/625* (2014.01)

(52) U.S. Cl.
CPC ........... *H01M 2/10* (2013.01); *H01M 2/1016* (2013.01); *H01M 2/202* (2013.01); *H01M 10/625* (2015.04)

(58) Field of Classification Search
CPC .. H01M 2/021; H01M 2/0245; H01M 2/1077; H01M 2/0217
See application file for complete search history.

(56) References Cited

U.S. PATENT DOCUMENTS

| 3,147,151 A * | 9/1964 | Toce ................... H01M 2/0245 429/120 |
| 2006/0057461 A1* | 3/2006 | Hamada .............. H01M 2/0237 429/181 |

(Continued)

FOREIGN PATENT DOCUMENTS

| CN | 201608209 U | 10/2010 |
| CN | 102280603 A | 12/2011 |

(Continued)

*Primary Examiner* — Maria Laios
(74) *Attorney, Agent, or Firm* — Muncy, Geissler, Olds & Lowe, P.C.

(57) ABSTRACT

A secondary battery packing case structure is provided, where a first joint portion that protrudes outward and a first embedded block are formed on a side surface of the case, a second joint portion that protrudes outward and a second embedded block are formed on another side surface opposite to the foregoing surface, and the first joint portion and second joint portion of the case are in a diagonally symmetric state, the first embedded block and the second embedded block are in a diagonally symmetric state, and the second connector group of the case may be correspondingly connected to a first connector group of another same case in an inserted manner; and connector groups on two joint portions of the case are respectively electrically connected to two electrodes of an internal battery pack. In this way, a single packing case can completely isolate an anode and a cathode of a battery pack in the packing case, and when multiple cases are connected in series, in a status that no short-circuit component is installed, a battery in the case cannot discharge electricity, which can completely avoid a situation that an accident short circuit or activation occurs in the battery and ensure security of the battery in a series connection and a transportation process.

8 Claims, 11 Drawing Sheets

(56) References Cited

U.S. PATENT DOCUMENTS

2012/0064387 A1* 3/2012 Kim ...................... H01M 2/021
 429/158
2013/0295418 A1* 11/2013 Schaefer ............. H01M 2/0217
 429/10

FOREIGN PATENT DOCUMENTS

CN 104124408 A 10/2014
JP 2005158565 A 6/2005

* cited by examiner

SECONDARY BATTERY PACKING CASE STRUCTURE

BACKGROUND

Technical Field

The present invention relates to a secondary battery packing case structure and in particular, to, more specifically, a secure battery packing case structure that can completely isolate an anode and a cathode of a battery pack from each other, thereby avoiding an accidental short circuit or activation.

Related Art

Design of a lithium secondary battery aims at providing a high power source capacity, where electrical energy in a battery is quite high, which also means that once a short circuit occurs in such batteries, a great amount of thermal energy would be generated at some times. In addition, chemical constituents of such batteries may also catch fire because the battery is damaged or is designed or assembled improperly.

In consideration of these reasons, it is necessary to regulate security regulations to control transportation of these types of batteries. According to regulations of the International Civil Aviation Organization, a portable electronic apparatus (a watch, a calculator, a camera, a mobile phone, a portable computer, a portable camera, or the like) containing a lithium or lithium ion cell or battery for personal use of a passenger or a crew member shall be carried aboard an aircraft as carry-on baggage, and a content of lithium of a lithium metal battery shall not exceed 2 grams, and a rated energy value of a lithium ion battery shall not exceed 100 Wh.

In addition, a main power source of an existing electrical vehicle or power storage apparatus (for example: a Uninterruptible Power Supply; UPS) using a high electrical energy capacity is a battery, and characteristics, such as endurance and power supply stability, of the battery are very important. Generally, a battery system constituted by a plurality of battery modules that are electrically connected to each other is needed to supply a current required for startup, and each battery module usually includes multiple cells, a housing for accommodating the cells, and a constituent, such as a conductive plate, that is electrically connected to each cell to conduct electricity.

Moreover, at present, use of a packing case in a battery module is mainly out of consideration of convenience for assembly, and at present, most battery modules are designed as a housing accommodating a cell, which is not changed for many years. However, the design of a packing case accommodating a cell would usually cause a conductive plate to expose on the same side surface of the packing case (two electrode connectors are disposed on the same side surface of the battery packing case), and such design would easily cause a situation of a short circuit or an electrical shock because the conductive plate is improperly carelessly touched. Therefore, in terms of transportation, it is necessary to ensure that an exposed terminal or connector is protected by using a non-conductive end cover or an adhesive tape or in another manner, so as to avoid shaking and a collision during a transportation process, so as to prevent a battery from being in contact with another battery, a conductive surface, or a metal object, which causes an accident short circuit or activation of the battery, and ensure security in the transportation process.

SUMMARY

Hence, to resolve a problem that an existing secondary battery packing case would easily cause an accidental short circuit or activation of a battery, a main objective of the present invention is providing a secondary battery packing case, which can completely isolate an anode and a cathode of a battery unit in the packing case, so as to avoid shaking and a collision during a transportation process, so that even if the packing case is in contact with another packing case, a conductive surface, or a metal object, an accident short circuit or activation of a battery would not be caused, and security in the transportation process is ensured. Another objective of the present invention is providing a secondary battery packing case structure to enable electrical energy of a battery unit in each packing case to conform to regulations of the International Civil Aviation Organization and making a serial connection or combination manner between packing cases easy, which helps a user combine multiple packing cases to perform assembly for a required voltage and electrical energy capacity.

In order to achieve the foregoing objectives, the present invention discloses a secondary battery packing case structure, which is a case in a rectangular form and is applicable to packing a battery pack, where an upper half of a side surface of the case is provided with a first embedded block, and a lower half of the side surface extends outward to form a first joint portion, the first joint portion includes a first protrusion portion, a first connector group having two connectors is disposed above the first protrusion portion, and a first clamping groove is provided on a surface of the first protrusion portion; a lower half of another side surface opposite to the foregoing surface is provided with a second embedded block, and an upper half of the side surface extends outward to form a second joint portion, the second joint portion includes a second protrusion portion, a second connector group having two connectors is disposed below the second protrusion portion, and a second clamping groove is provided on a surface of the second protrusion portion; and the first joint portion and second joint portion of the case are in a diagonally symmetric state, the first embedded block and the second embedded block are in a diagonally symmetric state, the second connector group of the case may be correspondingly connected to a first connector group of another same case in an inserted manner, meanwhile, the second clamping groove may correspondingly clamp a first embedded block of the another case, and the second embedded block may correspondingly be clamped by a first clamping groove of the another case.

One connector of the first connector group of the case is electrically connected to a first electrode of the battery pack, one connector of the second connector group is electrically connected to a second electrode of the battery pack, and the first connector group and another connector of the second connector group are electrically connected to each other through a lead.

Two ends of a short-circuit component are inserted into one of the first connector group and the second connector group, so as to enable two connectors of the other connector group to respectively have polarities of the first electrode and the second electrode of the battery pack. After multiple cases are connected in series and joined together through the first joint portion and the second joint portion that are adjacent to each other, the first connector group is electrically connected to an adjacent second connector group, two ends of the short-circuit component are inserted into one of the first connector group and the second connector group on two ends of the cases that are connected in series, so as to enable two connectors of the other connector group to respectively have polarities of the first electrode and the second electrode of the battery pack.

The surface of the protrusion portion of one of the first joint portion and the second joint portion of the case is provided with a groove, the groove is used to install an electrode short-circuit component, and installation of the electrode short-circuit component controls one electrode of the battery pack in the case to be electrically connected to a connector group, so as to ensure security of the secondary battery packing case.

In another implementation manner, one connector of the first connector group of the case is electrically connected to a first electrode of the battery pack, one connector of the second connector group is electrically connected to a second electrode of the battery pack, and the foregoing two connectors cannot be directly electrically connected in series to two battery packs by combining the first connector group and the second connector group of the adjacent cases. In addition, the surface of the protrusion portion of one of the first joint portion and the second joint portion of the case is provided with a groove, the groove is used to install an electrode short-circuit component, and installation of the electrode short-circuit component controls an electrical connection between two connectors of a connector group of the joint portion.

In the foregoing implementation manner, when multiple cases are connected in series and joined together through the first joint portion and the second joint portion that are adjacent to each other, in a status that the groove of each case is installed with the electrode short-circuit component, connector groups on two ends of the cases that are connected in series respectively have polarities of the first electrode and the second electrode.

Advantages of the present invention are: by means of a secondary battery packing case of the present invention, a single packing case can completely isolate an anode and a cathode of a battery pack in the packing case, and when multiple packing cases are combined to form a series connection of battery packs, if there is no short circuit component, the battery packs cannot discharge electricity on a same side of the packing case, so as to completely avoid a danger that the anode and cathode collide with each other and are in contact with each other because of shaking during a transportation process. Even if the packing case is in contact with another packing case, a conductive surface, or a metal object, an accident short circuit or activation of a battery would not be caused, and security in the transportation process is ensured. Meanwhile, a serial connection or combination manner between packing cases is easy, which helps a user combine multiple packing cases to perform assembly for a required voltage and electrical energy capacity.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Detailed contents and technical description of the present invention are further described by using embodiments. However, it should be understood that the embodiments are merely provided for illustrative description and should not be interpreted as limitations to implementation of the present invention.

Figure 1:
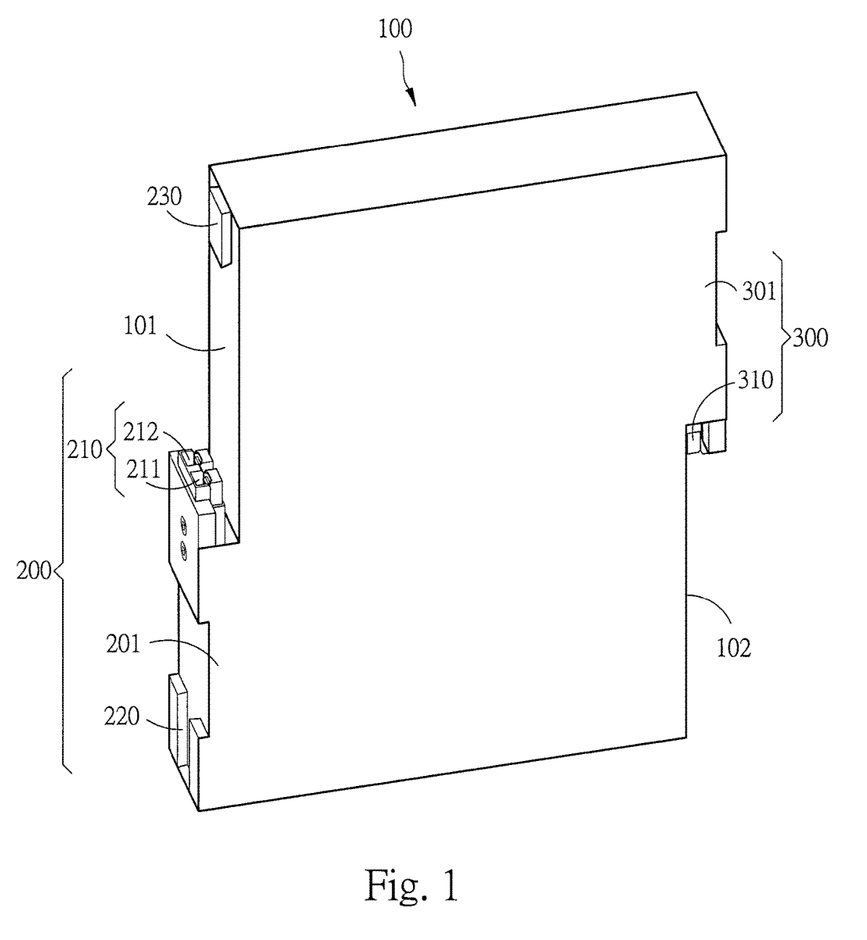
FIG. 1 is a three-dimensional schematic diagram I of a secondary battery packing case structure of the present invention.
Figure 2:
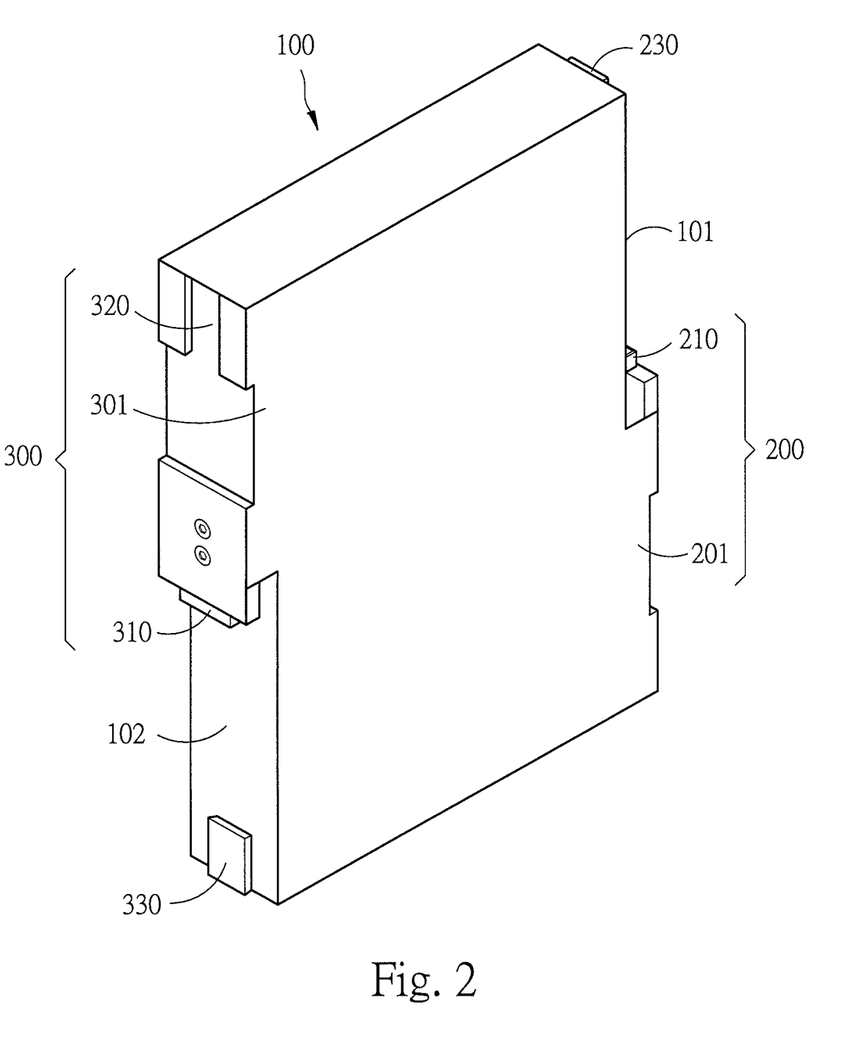
FIG. 2 is a three-dimensional schematic diagram I of a secondary battery packing case structure of the present invention.
Figure 3:
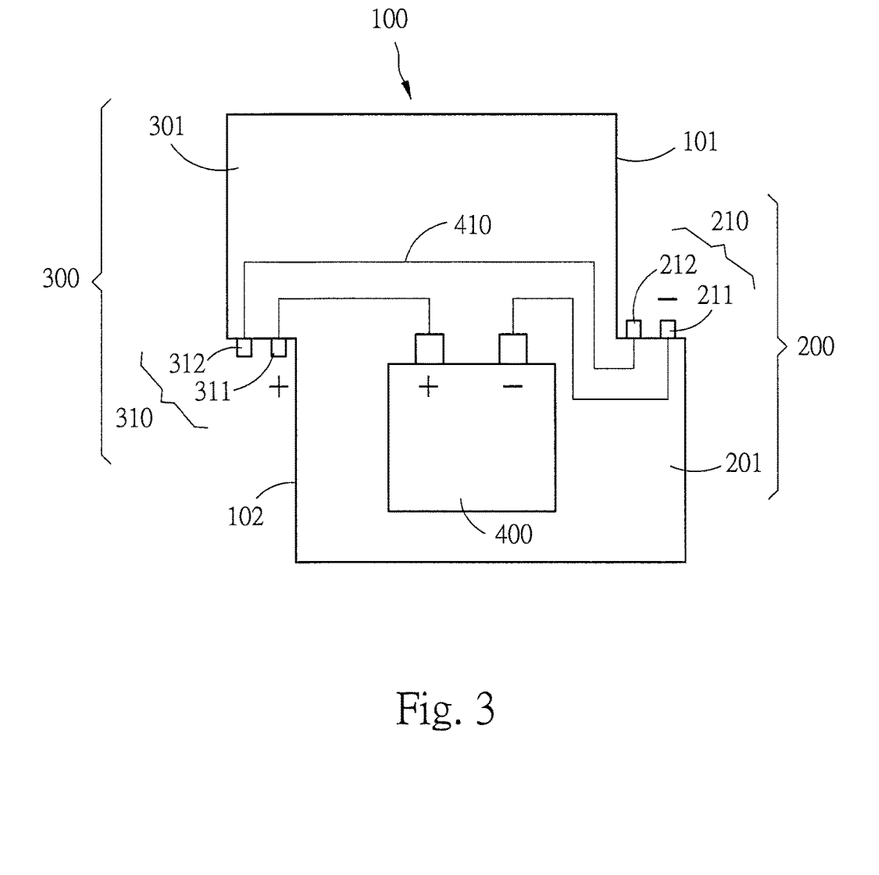
FIG. 3 is a schematic circuit diagram I of a secondary battery packing case of the present invention.

Referring to FIG. 1 to FIG. 3, the present invention is a secondary battery packing case structure, a packing case is a case 100 in a rectangular form, and the case 100 is applicable to packing a battery pack 400. An upper half of a side surface 101 of the case 100 is provided with a first embedded block 230, and a lower half of the side surface 101 extends outward to form a first joint portion 200, the first joint portion 200 includes a first protrusion portion 201, a first connector group 210 (including two connectors 211 and 212) is disposed above the first protrusion portion 201, and a first clamping groove 220 is provided on a surface of the first protrusion portion 201.

A lower half of another side surface 102 opposite to the foregoing surface surface 101 is provided with a second embedded block 330, and an upper half of the side surface 102 extends outward to form a second joint portion 300, the second joint portion 300 includes a second protrusion portion 301, a second connector group 310 (including two connectors 311 and 312) is disposed below the second protrusion portion 301, and a second clamping groove 320 is provided on a surface of the second protrusion portion 301.

In terms of the overall appearance structure, the first joint portion 200 and the second joint portion 300 of the case 100 are in a diagonally symmetric state, the first embedded block 230 and the second embedded block 330 are in a diagonally symmetric state, two connectors 311 and 312 of the second connector group 300 of the case 100 may be correspondingly fastened to two connectors 211 and 212 of a first connector group 200 of another same case 100 in an inserted manner, meanwhile, the second clamping groove 320 may correspondingly clamp a first embedded block 230 of the another case 100, and the second embedded block 230 may correspondingly be clamped by a first clamping groove 220 of the another case 100.

In terms of implementation, one connector of the first connector group 210 of the case 100 and one connector of the second connector group 310 of the case 100 are respectively electrically connected to two electrodes of an internal battery pack 400. The connector 211 of the first connector group 210 is electrically connected to a first electrode (the first electrode being a cathode is used as an illustrative example in the drawing) of the battery pack 400, the connector 311 of the second connector group 310 is electrically connected to a second electrode (the second electrode being an anode is used as an illustrative example in the drawing) of the battery pack 400, and the connector 311 of the second connector group 310 may be correspondingly connected to a connector 211 of a first connector group 210 of another same case 100 in an inserted manner; and another connector 212 and another connector 312 of the first connector group 210 and the second connector group 310 are electrically connected to each other through a lead 410.

Because in terms of implementation, the anode and cathode of the battery pack 400 in the case 100 are respectively connected to connectors 211 and 311 of the two side surfaces 101 and 102 of the case 100 in a guiding manner, the anode and cathode of the battery pack 400 in the case 100 may be completely isolated from each other, thereby avoiding shaking and collision of the anode and cathode during a transportation process. Even if the case 100 is in contact with another case 100, a conductive surface, or a metal object, an accident short circuit or activation of the internal battery pack 400 would not be caused, and security in the transportation process is ensured.

Figure 4:
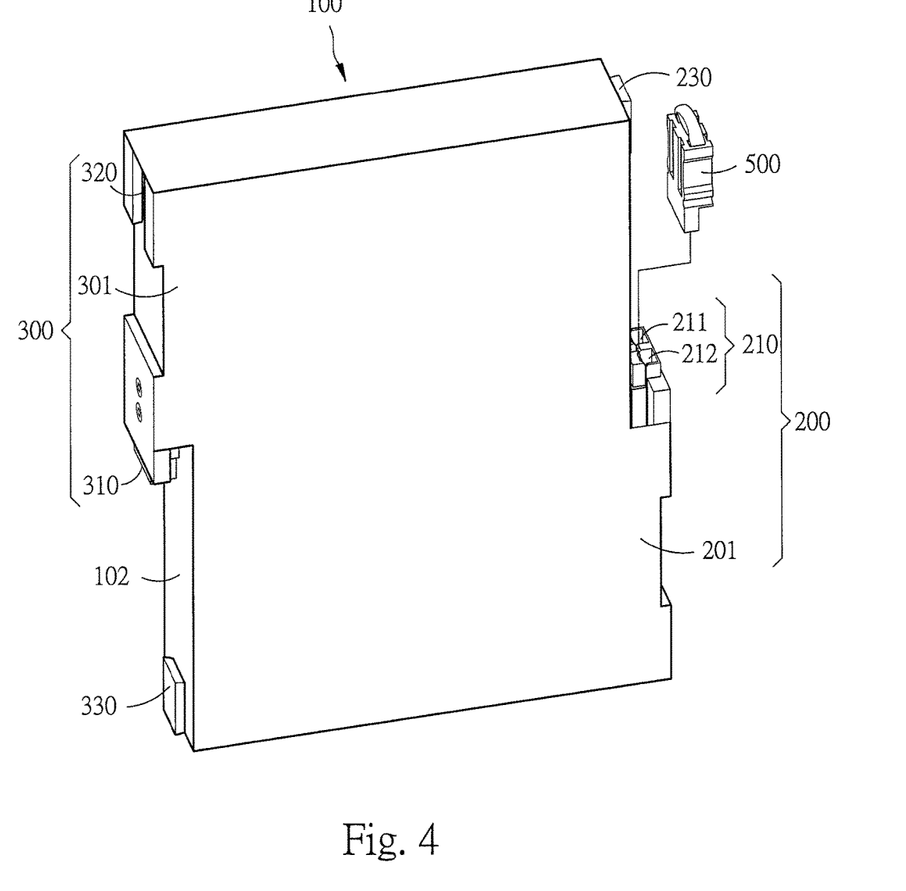
FIG. 4 is a schematic implementation diagram I of a secondary battery packing case of the present invention.

Further referring to FIG. 4, in terms of implantation application, two ends of a short-circuit component 500 are inserted into two connectors of one of the first connector group 210 and the second connector group 310, and the short-circuit component 500 may be a conductive component or a plug fuse. In FIG. 4, the short-circuit component 500 being inserted into the connectors 211 and 212 of the first connector group 210 is used as an illustrative example. In this way, the lead 410 enables the two connectors 311 and 312 of the second connector group 310 to respectively have polarities of the first electrode and second electrode of the battery pack 400, that is, the second connector group 310 has the anode and cathode of the internal battery pack 400 at the same time. In terms of use, electrical energy in the battery pack 400 may be led out through the two connectors 311 and 312 of the second connector group 310, and the electrical energy in the battery pack 400 in the case 100 may be led out to provide it for a load (not shown in the drawing) to use.

Figure 5:
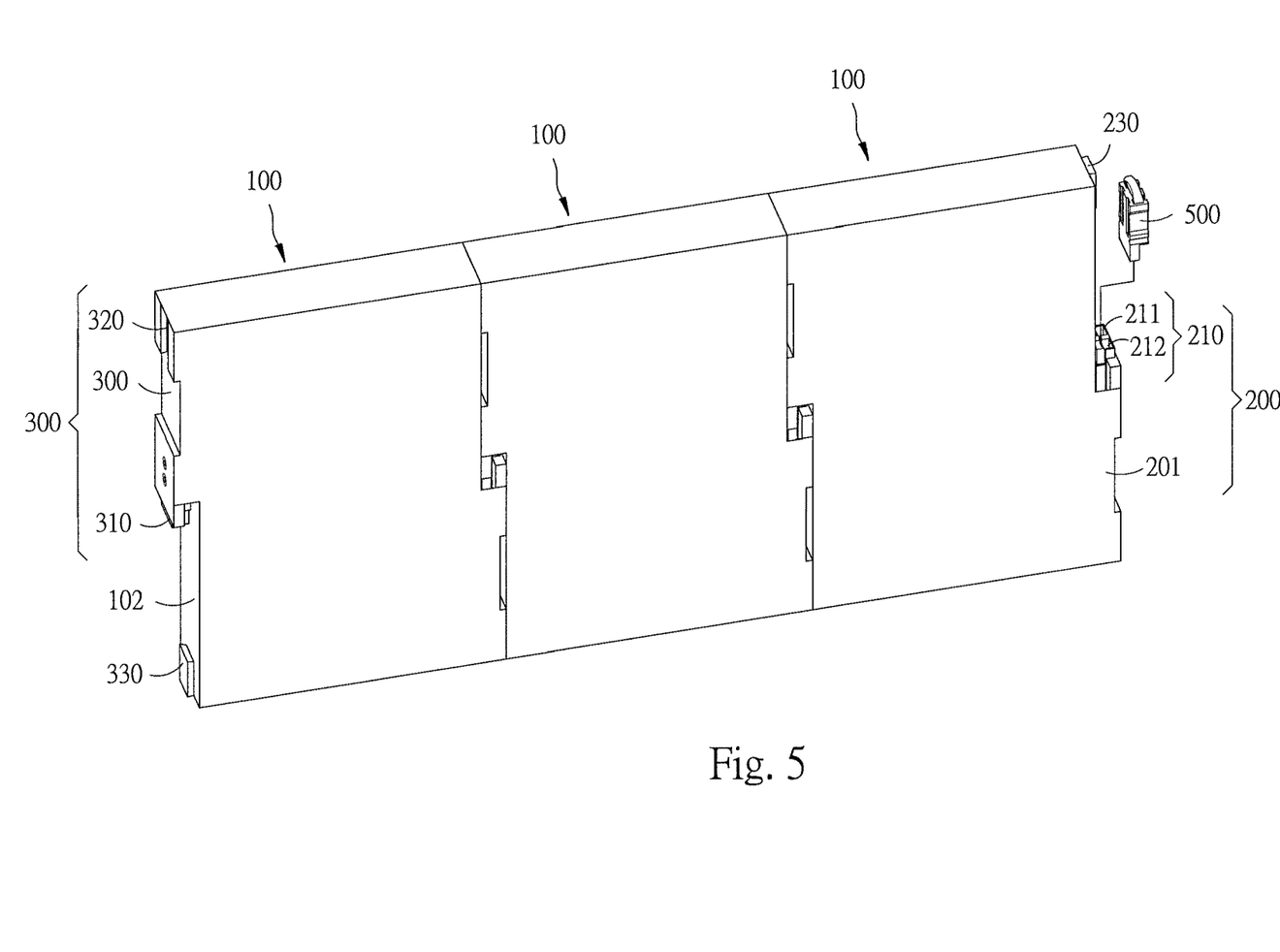
FIG. 5 is a schematic implementation diagram II of a secondary battery packing case of the present invention.
Figure 6:
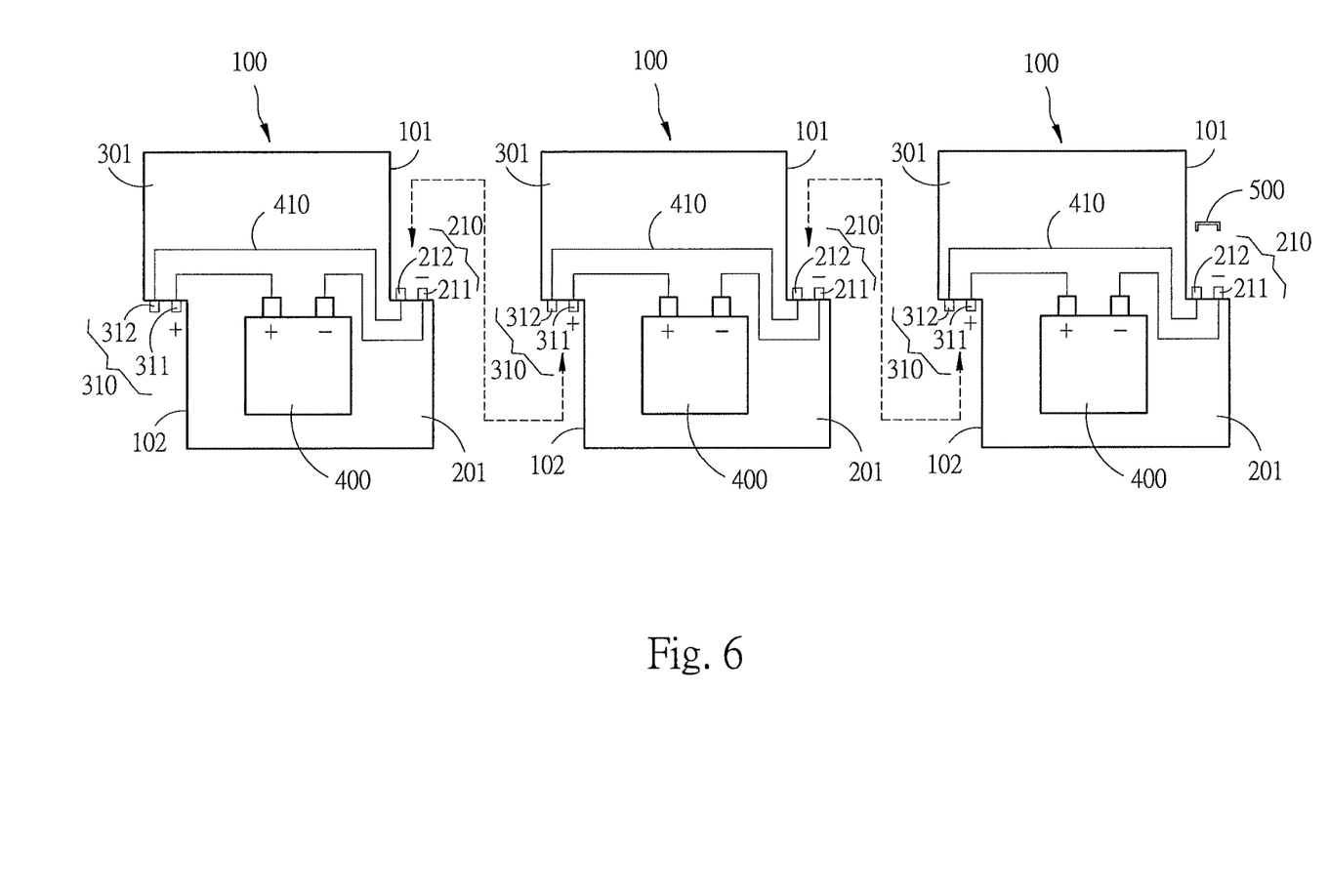
FIG. 6 is a schematic circuit diagram of FIG. 5.

Further referring to FIG. 5 and FIG. 6, in terms of implementation application, a user may also connect in series and join together multiple cases 100 through the first joint portion 200 and the second joint portion 300 that are adjacent to each other by means of the clamping between the first clamping groove 220 and the second embedded block 330 and the clamping between the second clamping groove 320 and the first embedded block 230. The first connector group 210 is electrically connected to a second connector 310 of another adjacent case 100, connectors 211 and 212 of the first connector group 210 are respectively electrically connected to connectors 311 and 312 of the second connector group 310, and in this way, a first electrode of a battery pack 400 in multiple cases 100 is connected to a second electrode of another battery pack 400, and leads 410 in the multiple cases 100 are electrically connected to each other, so as to connect in series the multiple battery packs 400 to obtain a required voltage and electrical energy capacity.

Moreover, in terms of implementation, the short-circuit component 500 is connected to one of the first connector group 210 and second connector group 310 on two ends of the cases 100. In FIG. 5 and FIG. 6, the short-circuit component 500 being inserted into a first connector group 210 of the rightmost case 100 is used as an illustrative example, so that connectors 311 and 312 of a second connector group 310 of a case 100 on the other end (the leftmost end) are respectively the anode and cathode of all battery packs 400. In this way, the second connector group 310 of the case 100 on the leftmost end may lead out the electrical energy from the battery packs in the cases 100 for a load (not shown in the drawing) to use.

In terms of overall application, a serial connection or combination manner between cases 100 is easy, which helps a user combine multiple cases 100 to perform assembly for a voltage and electrical energy capacity required by the user.

Figure 7:
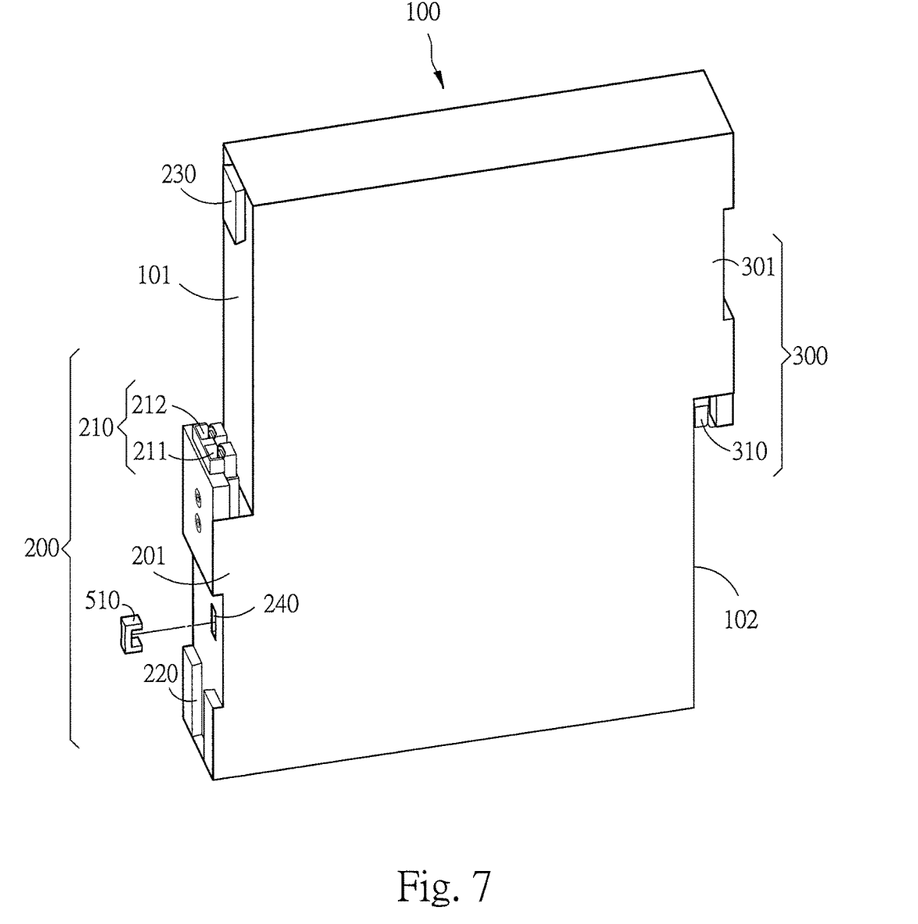
FIG. 7 is another schematic implementation diagram of a secondary battery packing case of the present invention.
Figure 8:
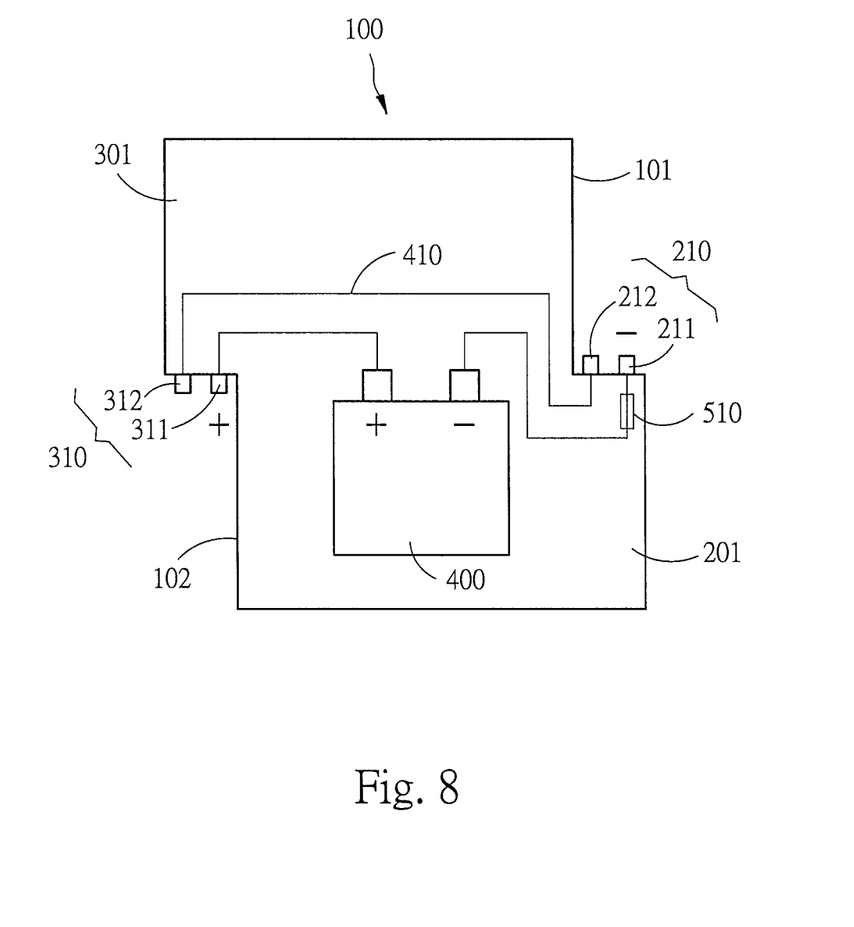
FIG. 8 is a schematic circuit diagram of an embodiment of FIG. 7.

Further referring to FIG. 7 and FIG. 8, which are another implementation manner of the present invention, one of the joint portions (the first joint portion 200 or second joint portion 300) of the forgoing case 100 is provided with a groove 240 (in FIG. 7, the groove 240 being provided on a surface of the first protrusion portion 201 of the first joint portion 200 is used as an illustrative example), the groove 240 is used to install an electrode short-circuit component 510, the electrode short-circuit component 510 may be a conductive component or a plug fuse, and the electrode short-circuit component 510 is used to electrically connect one electrode (the first electrode or second electrode) of the battery pack 400 to connectors of a connector group (the first connector group 210 or second connector group 310) in a guiding manner. In FIG. 8, the first electrode (the cathode) of the battery pack 400 being connected to the connector 211 of the first connector group 210 is used as an illustrative example.

In terms of implementation, the electrode short-circuit component 510 is inserted or not, so as to increase security of the secondary battery packing case of the present invention.

In this way, a single case 100 can completely isolate an anode and a cathode of an internal battery pack 400. Even after multiple cases 100 are connected in series and combined, if the electrode short-circuit component 510 and the short-circuit component 500 are not installed correctly at the same time, a battery pack 400 of each case 100 cannot be discharged, so that shaking, collision, and contact during a transportation process can be completely avoided. Even if the case 100 is in contact with another case 100, a conductive surface, or a metal object, an accident short circuit or activation of a battery would not be caused, and security in the transportation process is ensured.

Figure 9:
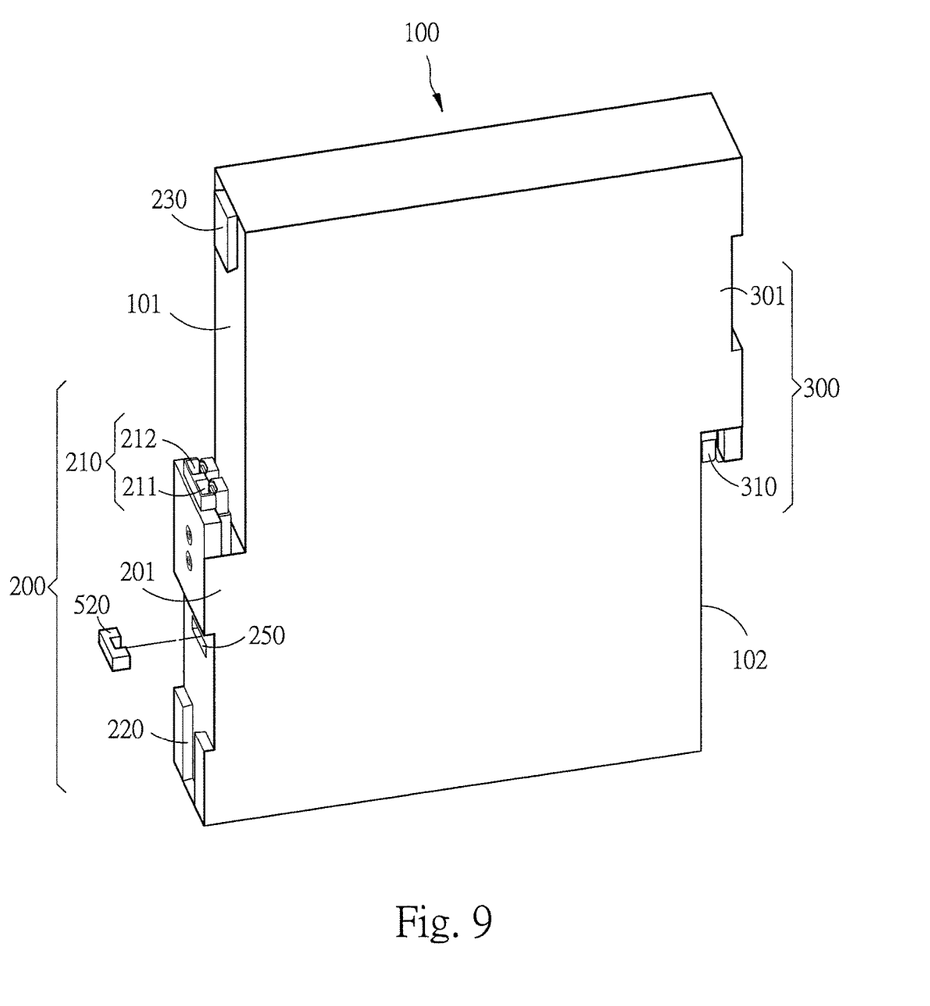
FIG. 9 is still another schematic implementation diagram of a secondary battery packing case of the present invention.
Figure 10:
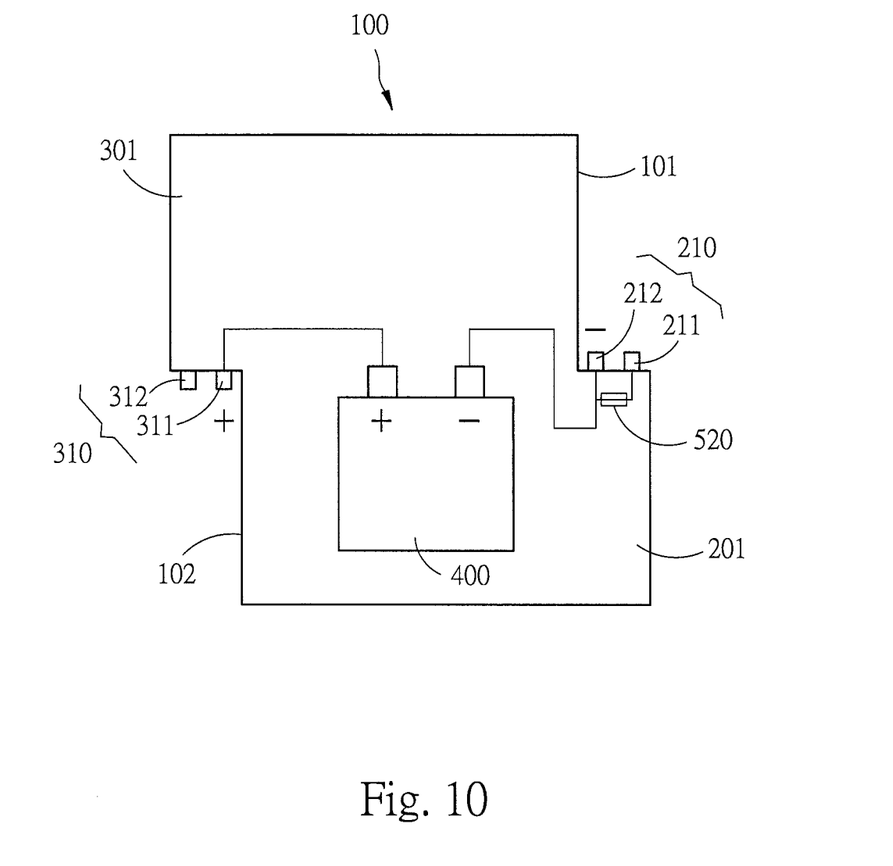
FIG. 10 is a schematic circuit diagram of an embodiment of FIG. 7.

Referring to FIG. 9 and FIG. 10, another embodiment of the present invention is similar to the structure of the foregoing case 100. However, the connector 212 of the first connector group 210 of the case 100 is electrically connected to a first electrode (the first electrode being a cathode is used as an illustrative example in the drawing) of the battery pack 400, the connector 311 of the second connector group 310 is electrically connected to a second electrode (the second electrode being an anode is used as an illustrative example in the drawing) of the battery pack 400, and in terms of implementation the foregoing two connectors 212 and 311 cannot be directly electrically connected in series to two battery packs 400 by combining the first connector group 210 and the second connector group 310 of the adjacent cases 100.

One of the joint portions (the first joint portion 200 or second joint portion 300) of the case 100 is provided with a groove 250 (in FIG. 7, the groove 250 being provided on a surface of the first protrusion portion 201 of the first joint portion 200 is used as an illustrative example), the groove 250 is used to install an electrode short-circuit component 520, the electrode short-circuit component 520 may be a conductive component or a plug fuse. Installation of the electrode short-circuit component 520 controls an electrical connection between the two connectors 211 and 212 of the first connector group 210 of the first joint portion 200, and the electrode short-circuit component 520 connects the two connectors 211 and 212 in a guiding manner, so that the two connectors 211 and 212 of the first connector group 210 are both the same electrodes of the battery pack 400 inside the case 100 (as shown in the drawing, a cathode is used as an illustrative example).

Figure 11:
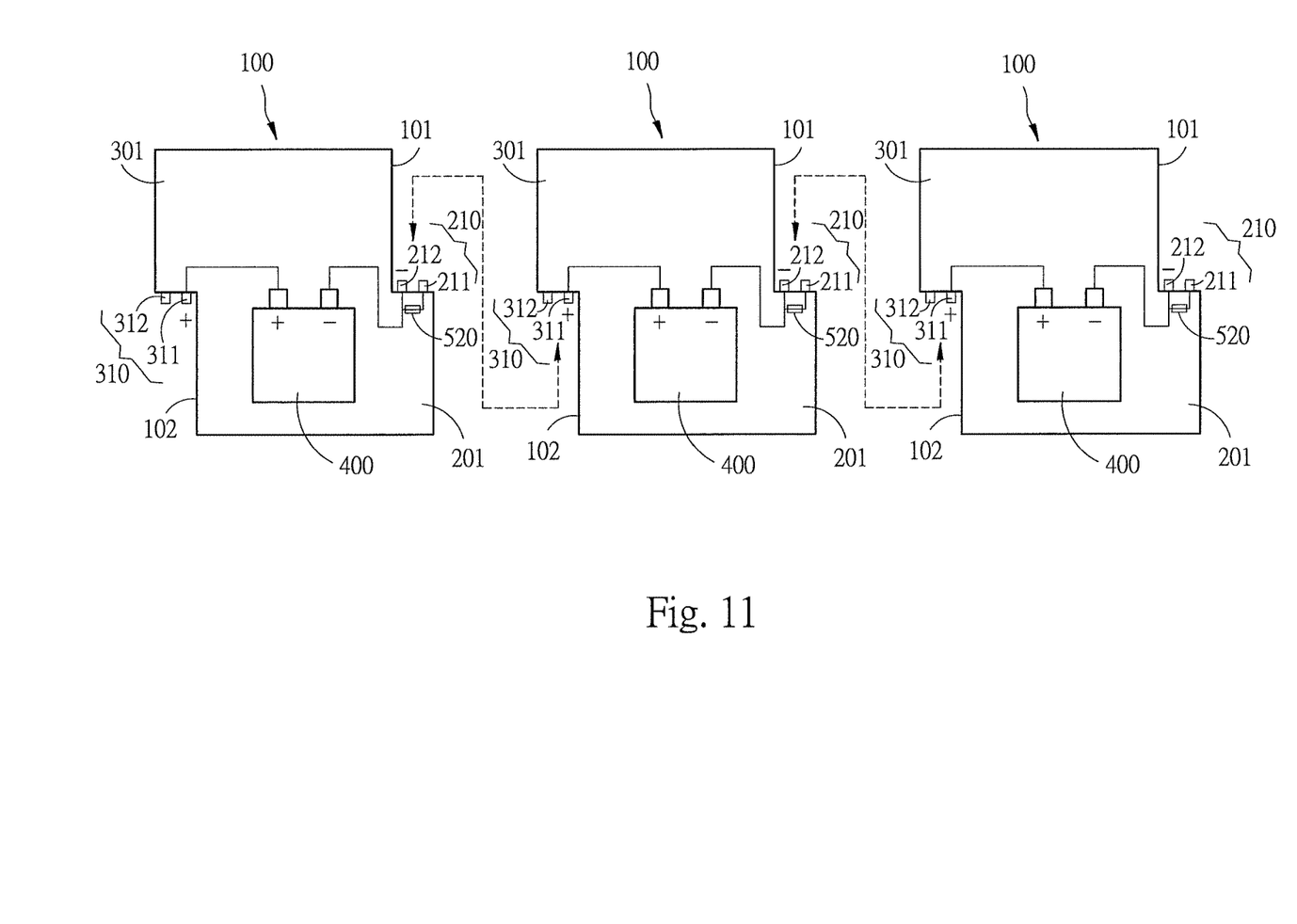
FIG. 11 is a schematic circuit diagram of a series connection an embodiment of FIG. 7.

Further referring to FIG. 11, in terms of implementation application, after the foregoing multiple cases 100 are connected in series and combined through the first joint portion 200 and the second joint portion 300 that are adjacent to each other by means of the clamping between the first clamping groove 220 and the second embedded block 330 and the clamping between the second clamping groove 320 and the first embedded block 230, when each case 100 is correctly installed with the electrode short-circuit component 520, after the first connector group 210 and a second connector group 310 of an adjacent case 100 are joined together, they can be electrically connected to each other, so that a first electrode of a battery pack 400 in multiple cases 10 is connected in series to a second electrode of another battery pack 400, and multiple battery packs 400 form a battery system in a series connection. Moreover, after the cases 100 are connected in series or combined, connector groups (210 and 310) on two ends respectively have polarities of the first electrode and second electrode (the anode and cathode) of the battery pack 400.

In this way, the foregoing single case 100 may completely isolate an anode and a cathode of an internal battery pack 400, and even after multiple cases 100 are connected in series and combined, if the electrode short-circuit component 520 is not correctly installed, the battery pack 400 in the case 100 cannot be discharged. In this way, shaking, collision, and contact in a transportation process can be completely avoided, and even if the case 100 is in contact with another case 100, a conductive surface, or a metal object, an accident short circuit or activation of a battery would not be caused, and security in the transportation process is ensured.

What is described in the foregoing is only an exemplary embodiment of the present invention, and definitely is not intended to limit the scope of the present invention, that is, all simple equivalent changes and modifications made according to the claims or the summary of the present invention fall within the scope of the present invention.

What is claimed is:

1. A secondary battery packing case structure, which is a case in a rectangular form and is applicable to packing a battery pack, wherein:
    an upper half of a side surface of the case is provided with a first embedded block, and a lower half of the side surface extends outward to form a first joint portion, the first joint portion comprises a first protrusion portion, a first connector group having two connectors is disposed above the first protrusion portion, and a first clamping groove is provided on a surface of the first protrusion portion;
    a lower half of an another side surface opposite to the side surface of the case is provided with a second embedded block, and an upper half of the another side surface extends outward to form a second joint portion, the second joint portion comprises a second protrusion portion, a second connector group having two connectors is disposed below the second protrusion portion, and a second clamping groove is provided on a surface of the second protrusion portion; and
    the first joint portion and second joint portion of the case are in a diagonally symmetric state, the first embedded block and the second embedded block are in a diagonally symmetric state.

2. The secondary battery packing case structure according to claim 1, wherein one connector of the first connector group of the case is electrically connected to a first electrode of the battery pack, one connector of the second connector group is electrically connected to a second electrode of the battery pack, and another connector of the first connector group and another connector of the second connector group are electrically connected to each other through a lead.

3. The secondary battery packing case structure according to claim 2, wherein a short-circuit component are inserted into one of the first connector group or the second connector group, so as to enable two connectors of the connector group without the short-circuit component inserted to respectively have polarities of the first electrode and the second electrode of the battery pack.

4. A secondary battery packing case structure, which is a case in a rectangular form and is applicable to packing a battery pack, wherein:
    an upper half of a side surface of the case is provided with a first embedded block, and a lower half of the side surface extends outward to form a first joint portion, the first joint portion comprises a first protrusion portion, a first connector group having two connectors is disposed above the first protrusion portion, and a first clamping groove is provided on a surface of the first protrusion portion;
    a lower half of an another side surface opposite to the side surface of the case is provided with a second embedded block, and an upper half of the another side surface extends outward to form a second joint portion, the second joint portion comprises a second protrusion portion, a second connector group having two connectors is disposed below the second protrusion portion, and a second clamping groove is provided on a surface of the second protrusion portion;
    the surface of the protrusion portion of one of the first joint portion and the second joint portion of the case is provided with a groove, the groove is used to install an electrode short-circuit component, and the electrode short-circuit component controls one electrode of the battery pack in the case to be electrically connected to a connector group; and
    the first joint portion and second joint portion of the case are in a diagonally symmetric state, the first embedded block and the second embedded block are in a diagonally symmetric state.

5. The secondary battery packing case structure according to claim 4, wherein one connector of the first connector group of the case is electrically connected to a first electrode of the battery pack, one connector of the second connector group is electrically connected to a second electrode of the battery pack, and another connector of the first connector group and another connector of the second connector group are electrically connected to each other through a lead.

6. The secondary battery packing case structure according to claim 5, wherein a short-circuit component are inserted into one of the first connector group or the second connector group, so as to enable two connectors of the connector group without the short-circuit component inserted to respectively have polarities of the first electrode and the second electrode of the battery pack.

7. A secondary battery packing case structure, which is a case in a rectangular form and is applicable to packing a battery pack, wherein:
    an upper half of a side surface of the case is provided with a first embedded block, and a lower half of the side surface extends outward to form a first joint portion, the first joint portion comprises a first protrusion portion, a first connector group having two connectors is disposed above the first protrusion portion, and a first clamping groove is provided on a surface of the first protrusion portion;

a lower half of an another side surface opposite to the side surface of the case is provided with a second embedded block, and an upper half of the another side surface extends outward to form a second joint portion, the second joint portion comprises a second protrusion portion, a second connector group having two connectors is disposed below the second protrusion portion, and a second clamping groove is provided on a surface of the second protrusion portion;

the surface of the protrusion portion of one of the first joint portion and the second joint portion of the case is provided with a groove, the groove is used to install an electrode short-circuit component, and the electrode short-circuit component controls an electrical connection between two connectors of the first connector group or the second connector group; and the first joint portion and second joint portion of the case are in a diagonally symmetric state, the first embedded block and the second embedded block are in a diagonally symmetric state.

8. The secondary battery packing case structure according to claim 7, wherein one connector of the first connector group of the case is electrically connected to a first electrode of the battery pack, one connector of the second connector group is electrically connected to a second electrode of the battery pack.

* * * * *